May 6, 1952 K. SMITH 2,595,717
GOLF CLUB SCALE
Filed Jan. 2, 1948
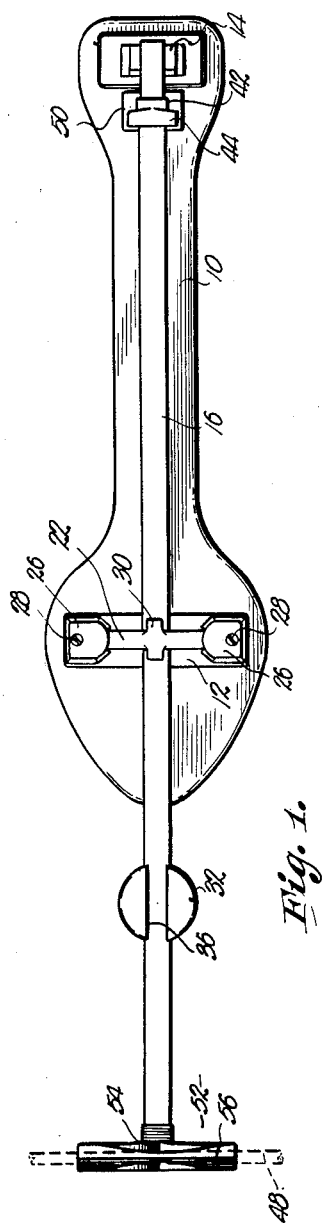
INVENTOR.
Kenneth Smith
BY
ATTORNEY.

Patented May 6, 1952

2,595,717

UNITED STATES PATENT OFFICE 2,595,717

GOLF CLUB SCALE

Kenneth Smith, Lenexa, Kans.

Application January 2, 1948, Serial No. 52

2 Claims. (Cl. 73—65)

This invention relates broadly to the field of sports and more specifically to a device for weighing various types of tools such as golf clubs, to determine not only the weight thereof but its balance.

The most important object of this invention is the provision of a golf club scale adaptable not only to determine the weight of such clubs but to learn the swinging balance thereof.

Another important object of this invention is the provision of a scale having an elongated graduated bar pivotally mounted intermediate the ends thereof and having specially formed structure including a cradle on the bar adjacent one end thereof for not only holding the golf club in a position substantially parallel with the bar for determining the swinging balance thereof, but usable for supporting the golf club when the weight thereof is being learned.

A further object of this invention is the provision of a scale having a substantially T-shaped cradle for receiving the golf club intermediate the ends thereof when swinging balance is being determined and also having a groove disposed in transverse relationship to the longitudinal axis of the graduated bar of the scale for supporting the golf club when the same is being weighed.

Other objects of this invention include the specific manner in which the graduated bar of the scale is pivotally mounted upon a U-shaped support therefor; the way in which a counter-poise is slidably mounted upon the bar for reciprocation longitudinally therealong without interference by the pivoting means; the manner in which the free end of the golf club handle is supported upon the scale beam; the manner in which a counter-weight is suspended from one end of the scale beam; and the way in which the extent of swinging movement of the scale beam is limited.

Other objects will be made clear or become apparent during the course of the following specification, reference being had to the accompanying drawing, wherein:

Figure 1 is a top plan view of a golf club scale made in accordance with my present invention.

Fig. 2 is a side elevational view thereof showing a golf club positioned thereon for determining its swinging balance.

Fig. 3 is a cross sectional view taken on line III—III of Fig. 2 looking in the direction of the arrows.

Fig. 4 is a cross sectional view taken on line IV—IV of Fig. 2 looking in the direction of the arrows; and Fig. 5 is a fragmentary detailed cross sectional view taken on line V—V of Fig. 3.

Many of the more popular sports today have developed to a point where the players require the tools utilized, to be highly accurate in balance, weight, durability and other factors. This has become particularly true with respect to the game of golf since experience has taught that more accurate games can be played if the golf clubs themselves are produced to be particularly adaptable to the individual player. The size, weight and shape of the golf club head as compared with the handle, therefor and its length is highly important, therefore, not only the weight of such clubs must be determined but their swinging balance also made known to the player.

The scale about to be described is, therefore, particularly useful in that it is adaptable not only to serve as a weighing medium for the club itself but may also be used to determine the swinging balance of such club.

In the drawing, a flat, elongated base, broadly designated by the numeral 10, supports a pair of spaced apart up-standing members 12 and 14. The member 12 is U-shaped as clearly illustrated in Fig. 3 of the drawing, the bight thereof extending transversely to base 10 near one end thereof and the legs extending upwardly. An elongated bar constituting the scale beam and designated by the numeral 16 has graduations 18 formed thereon marked by suitable indicia 20.

This bar 16 is pivotally mounted intermediate the ends thereof to the up-standing member 12 by means of a pivot bar 22. A V-shaped notch 24 is formed in the uppermost end of each of the legs of up-standing member 12 for receiving the corresponding ends of pivot bar 22. As clearly illustrated in Fig. 5, this pivot bar 22 is triangular-shaped in transverse cross section and one of the angles thereof rests within the notches 24 at their apex. The angles of the notches 24 are greater than that of the pivot bar 22 to the end that the scale beam 16 is free to swing on the horizontal axis defined by pivot bar 22.

A pair of plates 26 close the uppermost end of the notches 24 and these plates 26 are held in place through the medium of screws or the like 28.

An enlarged boss 30 formed on the pivot bar 22 midway between the ends thereof, depends slightly therebelow and is affixed directly to the uppermost face of the bar 16 through the medium of a screw or the like (not shown). The width of this boss 30 is slightly less than the width of the bar 16 to which it is affixed to provide clearance for a counter-poise 32 slidably mounted upon the bar 16. This counter-poise 32 is reciprocable throughout substantially the entire length of bar 16 through the medium of a polygonal opening 34 formed therein for receiving bar 16.

A slot 36 formed in the uppermost end of this counter-poise 32 registers with the opening 34 and receives the boss 30 as counter-poise 32 is reciprocated past the pivot bar 22. The up-standing member 14 is bifurcated at the uppermost end thereof to receive the proximal end of bar 16 and the legs thereof have opposed notches 38 formed therein to receive a transverse pin 40 in the bar 16. Thus the notches 38 and pin 40 cooperate to limit the extent of swinging movement of bar 16 on member 12.

An arm 42 affixed to the bar 16 inwardly from pin 40 and adjacent thereto extends upwardly and has its uppermost end re-bent upon itself as at 44. This rebent end 44 has an arcuate cavity 46 formed in the free end thereof to receive the free end of the handle of a golf club 48, as hereinafter more fully described.

A counter-weight 50, secured to the member 42, depends from the bar 16. That end of the bar 16 opposite to the pin 40 and member 42 thereon, has a cradle broadly designated by the numeral 52 affixed thereto in any suitable manner, not shown. This cradle 52 is substantially T-shaped and extends upwardly from the bar 16. A groove 54 formed in the cradle 52 accommodates the golf club 48 when the same is in the position illustrated in Fig. 2, and a second groove 56 intersecting the groove 54 and disposed in transverse relationship to the longitudinal axis of bar 16 receives the club 48 when the same is positioned thereon in the manner illustrated in Fig. 1 of the drawings.

It is clear from the foregoing that when the golf club 48 is positioned upon the cradle 52 with its longitudinal axis in transverse relationship to the longitudinal axis of the bar 16 and suitably balanced thereon where the same will be self-supporting, its weight may be determined by movement of the counter-poise 32 to a position where the pin 40 is mid-way between the ends of the notches 38 of member 14. By the same token, the swinging balance of club 48 may be determined by positioning club 48 upon the scale in the manner illustrated in Fig. 2. When club 48 is so positioned, the free ends of its handle underlies the hook formed by offset portion 44 and cavity 46 of member 42 while the handle rests upon the cradle 52 within the groove 54 thereof intermediate its ends. The inherent weight of the club head will maintain the free end of its handle against the cavity 46 whereby the handle of club 48 is substantially parallel to the bar 16 and free and clear of pivot bar 22. Again the counter-poise 32 may be moved along bar 16 to a position where the scale is in balance. The graduations 18 may be utilized to record the swinging balance of such clubs 48 and comparisons may be made with other clubs, all to the end that an individual player may have a set of golf clubs wherein each club has the same swinging balance.

While the foregoing specification has been limited to the measurement of golf clubs, it is apparent that the scale may be easily used or simply modified to accommodate various types of elongated objects for not only determining their weights but learning whether or not such objects have the swinging balance desired.

Manifestly many changes and modifications may, therefore be made without departing from the spirit of this invention as defined by the scope of the appended claims.

Having thus described the invention, what is claimed as new and desired to be secured by Letters Patent is:

1. A combination weighing and balance comparison device for golf clubs and the like, said device comprising an elongated, horizontal bar; means for pivotally mounting said bar intermediate the ends thereof; structure on the bar for supporting a club in substantial alignment longitudinally therewith; means on the bar at one side of the pivot for alternately supporting said club with the full weight thereof on said one side of the pivot; and means on the bar for balancing the same on said pivot when a club is supported by the bar, said structure comprising an element on each side of said pivot respectively, one of the elements comprising a transverse bar-like cradle, said first mentioned means on the bar including a groove formed in said cradle.

2. A combination weighing and balance comparison device for golf clubs and the like, said device comprising an elongated, horizontal bar; means for pivotally mounting said bar intermediate the ends thereof; structure on the bar for supporting a club in substantial alignment longitudinally therewith; means on the bar at one side of the pivot for alternately supporting said club with the full weight thereof on said one side of the pivot; and means on the bar for balancing the same on said pivot when a club is supported by the bar, said structure comprising an element on each side of said pivot respectively, said first mentioned means on the bar comprising an elongated, club-receiving groove formed in one of said elements, there being a transverse groove in said one element for receiving the club when supported by both elements.

KENNETH SMITH.

REFERENCES CITED

The following references are of record in the file of this patent:

UNITED STATES PATENTS

| Number | Name | Date |
|---|---|---|
| 691,437 | Bogue | Jan. 21, 1902 |
| 1,259,181 | White | Mar. 12, 1918 |
| 1,458,475 | Freed | June 12, 1923 |
| 1,897,027 | Gumprich | Feb. 7, 1933 |
| 1,953,916 | Adams | Apr. 10, 1934 |
| 2,108,877 | Wettlaufer | Feb. 22, 1938 |

FOREIGN PATENTS

| Number | Country | Date |
|---|---|---|
| 283,523 | Germany | Aug. 20, 1915 |